United States Patent [19]
Hagersten et al.

[11] Patent Number: 5,862,357
[45] Date of Patent: Jan. 19, 1999

[54] HIERARCHICAL SMP COMPUTER SYSTEM

[75] Inventors: Erik E. Hagersten, Palo Alto, Calif.; Mark D. Hill, Madison, Wis.

[73] Assignee: Sun Microsystems, Inc.

[21] Appl. No.: 674,688

[22] Filed: Jul. 2, 1996

[51] Int. Cl.⁶ .................................................. G06F 13/00
[52] U.S. Cl. ..................................... 395/309; 395/200.68
[58] Field of Search ...................................... 395/200, 280

[56] References Cited

U.S. PATENT DOCUMENTS

| | | | |
|---|---|---|---|
| 4,398,176 | 8/1983 | Dargel et al. | 382/27 |
| 5,038,386 | 8/1991 | Li | 382/49 |
| 5,280,621 | 1/1994 | Barnes et al. | 395/800 |
| 5,542,074 | 7/1996 | Kim et al. | 395/800 |
| 5,613,071 | 3/1997 | Rankin et al. | 395/200.16 |

OTHER PUBLICATIONS

Cox et al., "Adaptive Cache Coherency for Detecting Migratory Shared Data," Proc. 20$^{th}$ Annual Symposium on Computer Architecture, May 1993, pp. 98–108.

Stenström et al., "An Adaptive Cache Coherence Protocol Optimized for Migratory Sharing," Proc. 20$^{th}$ Annual Symposium on Computer Architecture, May 1993 IEEE, pp. 109–118.

Wolf–Dietrich Weber et al., "Analysis of Cache Invalidation Patterns in Multiprocessors", Computer Systems Laboratory, Stanford University, CA, pp. 243–256.

Kourosh et al., "Two Techniques to Enhance the Performance of Memory Consistency Models," 1991 International Conference on Parallel Processing, pp. 1–10.

Li et al., "Memory Coherence in Shared Virtual Memory Systems," 1986 ACM, pp. 229–239.

D. Lenosky, PhD, "The Description and Analysis of DASH: A Scalable Directory–Based Multiprocessor," *DASH Prototype System*, Dec. 1991, pp.36–56.

Hagersten et al., "Simple COMA Node Implementations," Ashley Saulsbury and Anders Landin Swedish Institute of Computer Science, 12 pages.

Saulsbury et al., "An Argument for Simple COMA," Swedish Institute of Computer Science, 10 pages.

Hagersten et al., "Simple COMA," Ashley Saulsbury and Anders Landin Swedish Institute of Computer Science, Jul. 1993, pp. 233–259.

*Primary Examiner*—Ayaz R. Sheikh
*Assistant Examiner*—David A. Wiley
*Attorney, Agent, or Firm*—Conley, Rose & Tayon, PC; B. Noel Kivlin

[57] ABSTRACT

A symmetrical multiprocessing system includes a plurality of nodes interconnected by a hierarchical bus. To allow for the transfer of data between nodes and to restrict the global transfer of local transactions, a plurality of address partitions are defined: global space, local space, remote read space, and remote read and write space. Process private and local data is accessed using local space. Global data is accessed using global space. In one embodiment, a kernel of the operating system is resident in the local space of each node. Because the memory space where the kernel resides is designated as local space, no other nodes can write to, or corrupt, the node's kernel.

7 Claims, 4 Drawing Sheets

HIERARCHICAL SMP COMPUTER SYSTEM

BACKGROUND OF THE INVENTION

1. Field of the Invention

The present invention is related to the field of symmetrical multiprocessing systems and, more particularly, to a symmetrical multiprocessing system including a hierarchical architecture.

2. Description of the Related Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

What is desired is a bus structure that supports the bandwidth requirements of a multiprocessor system with many high performance microprocessors and a relatively large physical distance separating the multiprocessors.

SUMMARY OF THE INVENTION

The problems outlined above are in large part solved by a hierarchical bus with a plurality of address partitions. Each physical memory location is mapped to multiple addresses. Therefore, each physical memory location can be accessed using a plurality of address aliases. The properties of each address partition are used by the hierarchical bus structure to determine which transaction are transmitted globally and which transactions are transmitted locally. In this manner, the hierarchical bus architecture eliminates global broadcasts of local transactions.

Broadly speaking, the present invention contemplates a multiprocessor architecture including a plurality of processing nodes, a plurality of low level buses, wherein each processing node is coupled to one of said plurality of low level buses, a plurality of repeaters, wherein each repeater is coupled to one of said low level buses, a top level bus and a system memory. The top level bus is connected to a plurality of repeaters and the repeaters control the transfer of data between the low level buses and the top level bus. The system memory includes a plurality of memory locations. Each of the processing nodes is configured to access all of the memory locations. The system memory locations map to a plurality of address partitions, whereby the system memory locations are addressed by a plurality of address aliases. Properties of the address partitions dictate the control of the transfer of data between the low level buses and the top level bus by the repeaters.

The present invention further contemplates a shared memory system including a plurality of memory locations, wherein the memory locations are allocated to one of a plurality of processing nodes. The memory locations are configured to be accessed by the plurality of processing nodes. The system memory locations map to a plurality of address partitions, whereby the system memory locations are addressed by a plurality of address aliases, and properties of the address partitions dictate which of the processing nodes have access to a data request.

The present invention still further contemplates a method for location specific data transfers on a hierarchical bus. The method includes the steps of: assigning a virtual address range to a process running on a node of said hierarchical bus, performing a data request to an address within said virtual address range, translating said virtual address to a physical address, and determining if said physical address is within a portion of memory designated as global or local. If the physical address is within a portion of memory designated as global, the memory is accessing using a global address. If the physical address is within a portion of memory designated local, determining that the physical address is within local memory. If the physical address is within local memory, accessing said physical address using a local address partition. If the physical address is not within local memory, trapping to the operating system. The operating system may rectify the trap in numerous manners. For example, data may be moved from the physical address to the local memory. Alternatively, the physical address may be remapped as a global address.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

A hierarchical bus includes a plurality of bus levels and nodes. A subset of the total number of nodes is connected to each of a plurality of low level busses. The low level busses are connected to one or more higher level busses via repeaters. The higher level busses are connected to even higher level busses via more repeaters. This concept naturally extends itself to as many levels of bus hierarchy as needed. At the highest stage, the repeaters are connected by a top level bus.

Figure 1:
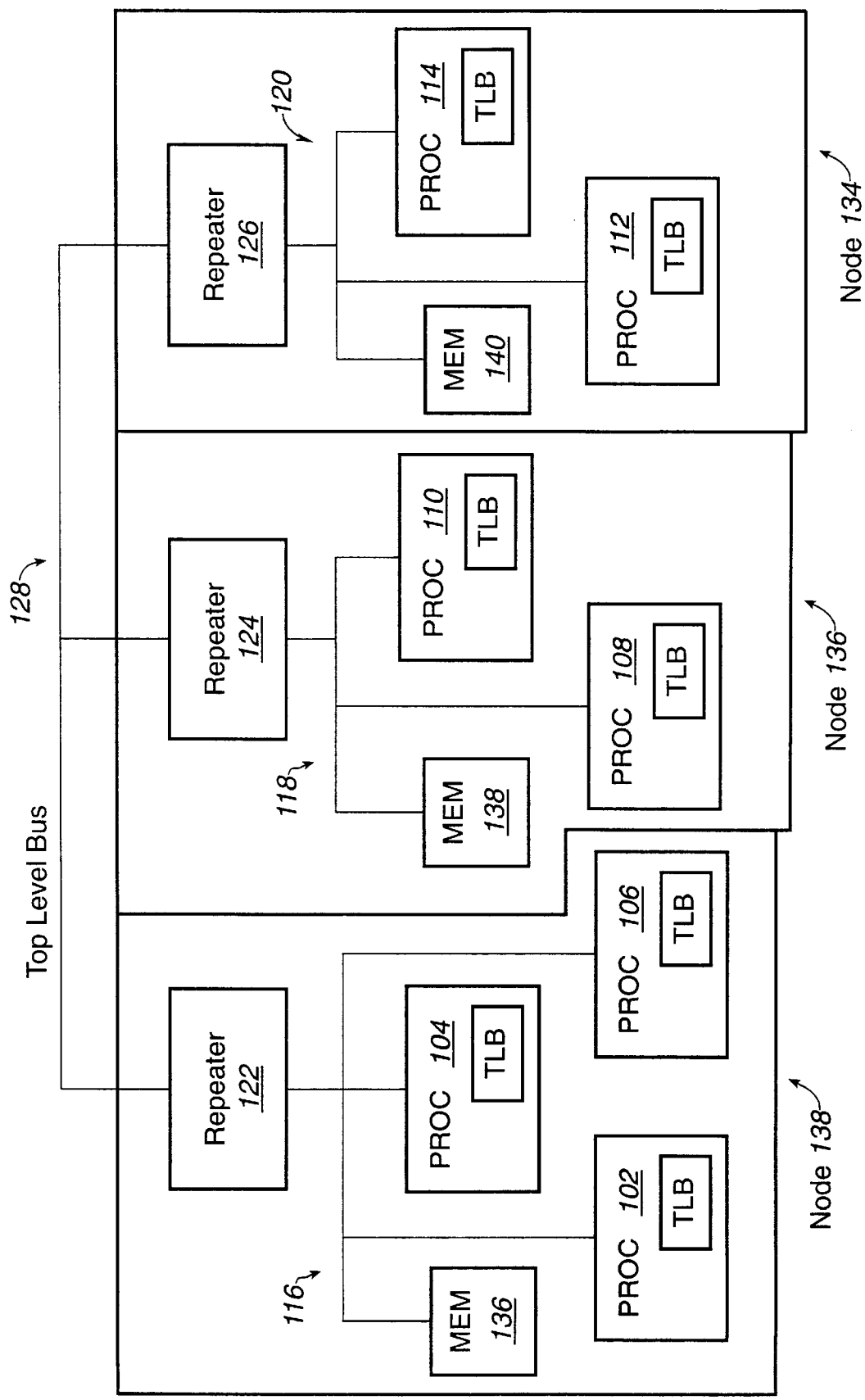
FIG. 1 is a block diagram of computer system that implements a hierarchical bus structure.

FIG. 1 illustrates a two level bus hierarchy. FIG. 1 includes nodes 138–134 and a top-level bus 128. Node 138 includes processors 102–106, low-level bus 116, memory 136, and repeater 122. Processors 102–106, repeater 122, and memory 136 are connected to low level bus 116. Processors 102–106 include a translation look-aside buffer (TLB). A TLB is a device that stores the most recently accessed virtual-to-physical address translations. Node 136 includes processors 108–110, low-level bus 118, repeater 124 and memory 138. Processors 108–110, memory 138 and repeater 124 are connected to low level bus 118. Processors 108–110 include a translation look-aside buffer (TLB). Node 134 includes processors 112–114, low-level bus 120, memory 140, and repeater 126. Processors 112–114, memory 140 and repeater 126 are connected to low level bus 120. Processors 112–114 include a translation look-aside buffer (TLB).

Transactions from each processor are driven on the low level bus and retransmitted by the repeaters via top level bus 128. The repeaters receiving a retransmitted transaction further retransmit the transaction on the attached low level bus, which is received by the attached processors. For example, processor 102 sends a transaction on low level bus 116. Repeater 122 retransmits the transaction to repeaters 124 and 126. Repeaters 124 and 126 receive the transaction via top level bus 128 and retransmits the transaction on low level busses 118 and 120. Processors 108–114 receive the transaction from low level busses 118 and 120.

In one embodiment, a local transaction between two devices in the same node (e.g. a processor and a memory) are not transmitted globally (i.e. to all nodes on the hierarchical bus). The global transmission of local transactions unnecessarily reduces data throughput of the bus. It is apparent that a local transaction could be defined differently than transactions between devices in the same node. For example, multiple nodes can be clustered together. A local transaction in this configuration would be any transaction between nodes in the same cluster of nodes. A global transaction would be a transaction between clusters of nodes. The cluster of nodes forms a "local domain" over which local transactions are broadcast, while the set of clusters forms a "global domain" over which global transactions are broadcast. For example, a point to point interconnect between the repeaters 122–126 and a top repeater (not shown) may be employed to transmit transactions to the top repeater. The top repeater may then determine which repeaters 122–126 receive the transaction based upon the local/global nature of the transaction.

By not broadcasting local transactions globally, transactions may complete in a more efficient manner than if these transactions were broadcast. The local transactions are dependent only upon responses from other processors within the "local domain", while global transactions are dependent upon all the processors within the computer system shown in FIG. 1. For example, the low-level buses 116–120 may employ snooping protocols for maintaining cache coherency. Broadcasting a transaction to a nonlocal low-level bus may involve a transaction upon high level bus 128, followed by a broadcast to low-level buses 115–120, followed by another high level bus 128 transaction to convey the snoop response to the initiating low-level bus. A local transaction, on the other hand, simply collects responses from the low-level bus(es) to which it is coupled. Furthermore, local transactions may be performed concurrently within the multiple local domains. In addition, bandwidth upon the high level bus 128 is conserved.

Figure 2:
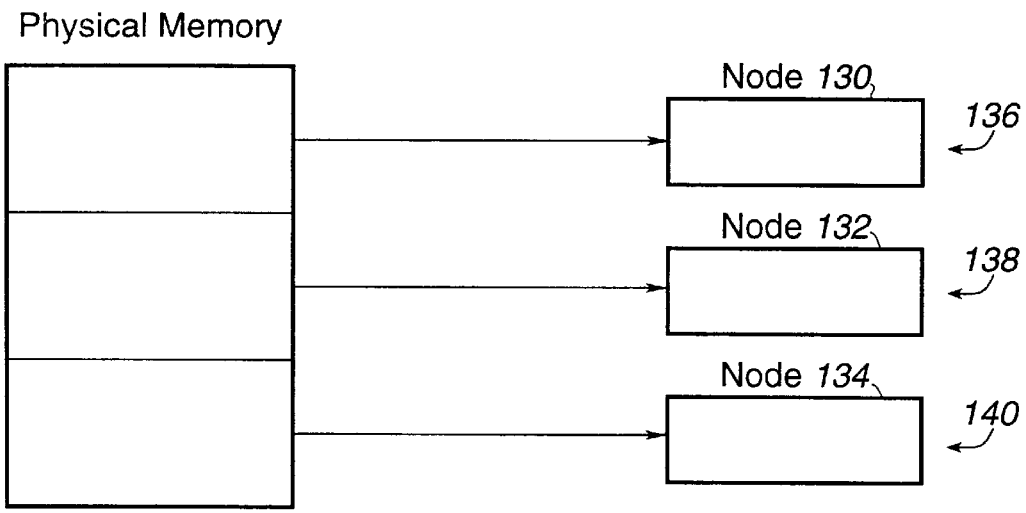
FIG. 2 illustrates the partitioning of physical memory among nodes of a hierarchical bus.

Turning now to FIG. 2, a diagram depicting allocation of the physical memory, or system memory, among the nodes of the multiprocessor system is shown. In one embodiment, the physical memory is equally divided among the processing nodes. Therefore, each of n processing nodes holds 1/n of the total physical memory locations. As illustrated in FIG. 2, in a three node multiprocessing system, physical memory 202 is divided into three local memories. Memory 136, one third of the physical memory, is allocated to node 130. Memory 138, also one third of physical memory 202, is allocated to node 132. Memory 140, is allocated to node 134. It is apparent that a multiprocessing system could allocate the memory in different proportions between the nodes. More particularly, node 130 may include a first amount of memory dissimilar from a second amount of memory in node 132 and a third amount of memory in node 134, etc.

Figure 3:
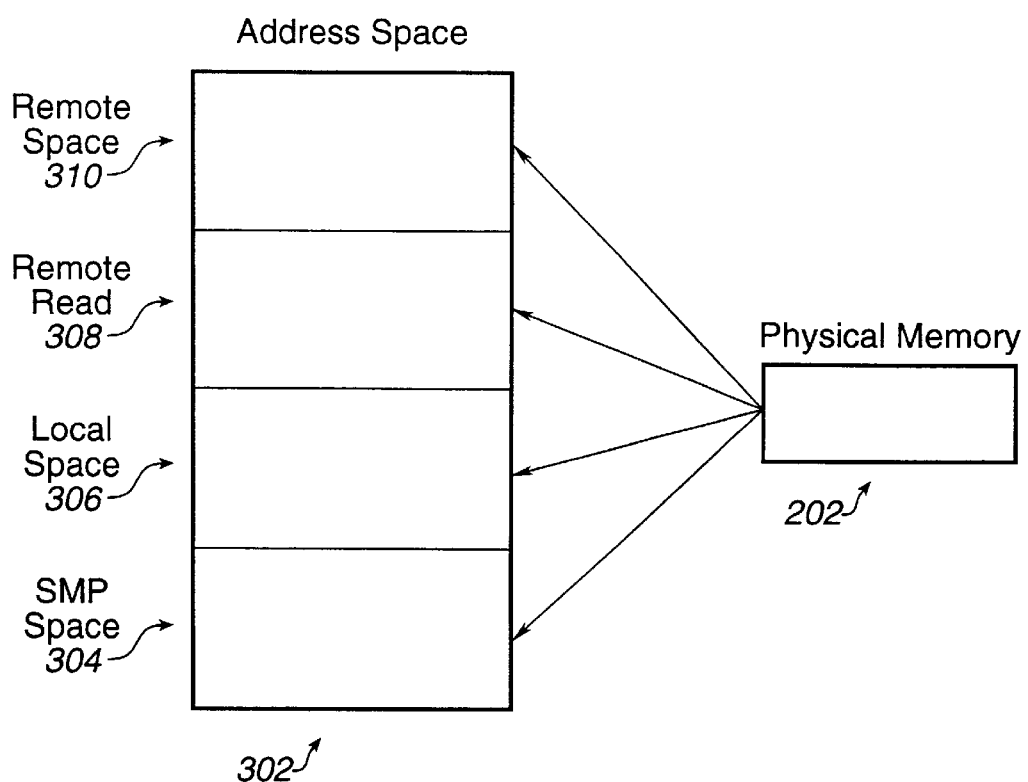
FIG. 3 illustrates a mapping of a physical memory to multiple address spaces.

Referring now to FIG. 3, each local memory (i.e., the memory allocated to a processing node) is mapped to multiple locations within address space 302. Address space 302 is comprised of multiple address partitions. Each physical memory location can be accessed using a plurality of address aliases (i.e., one from each partition). In one embodiment, address space 302 includes four address partitions: SMP-space 304 (SS), local-space 306 (LS), remote read space 308 (RR), and remote space 310 (RS). Each address partition is assigned properties which repeaters 122–126 use to control the transfer of data in the hierarchical bus structure.

The properties of each address partition are discussed in more detail below. SS 304 is the global address space, or global partition. Address aliases in this address partition are broadcast globally on the hierarchical bus. Therefore, accesses to a physical memory location not within the local address space of a node should use an SS address alias to access those memory locations. In addition, accesses to local memory space designated as global memory should use an SS address alias. Local memory may be designated as global memory if a process on a different node requires access to that memory.

Address partition LS 306 is the local address partition. Nodes may only use an address alias from LS 306 to access the portion of memory that is allocated to that node (i.e. local memory). Generally, the LS address partition may be used to access addresses within the local domain of the node, which may include other nodes. An access using an LS address alias to a physical memory location not to that node causes a trap when doing a page table walk or TLB access. The trap can be achieved if the system has a perprocessor page table structure or a per-node page table structure. LS addresses are accorded a translation only in the page tables for the local node or local processors. Therefore, no translation exists in a remote processor's translation structure.

Address partition RR 308 is used to read data from remote addresses. In one embodiment, processes running on a node may use RR 308 to perform a read-stream transaction from a remote address. Read-stream is transaction performed in response to an instruction defined by the SPARC architecture to transfer data into the processor without caching the data. Similarly, address partition RS 310 is used to perform readstream and write-stream instructions to remote memory. Write stream is an instruction defined by the SPARC architecture to transfer data from the processor without caching the data.

The address partitions are used to restrict and control the flow of data in a hierarchical bus computer system. The repeaters decide whether to broadcast a transaction to a higher level bus or to limit it to a low level based on the address partition of the transaction. For example, if node 138 attempted to address data stored in a memory location allocated to node 134, an SS address alias should be used to access the data. When repeater 122 receives a transaction with an SS address alias, it broadcasts the transaction on top level bus 128. In contrast, if node 138 attempts to access a memory location resident to node 138, which is not shared with other nodes, an LS address alias should be used. When repeater 122 receives an LS address alias, it does not broadcast the data on top level bus 128. Therefore, top level bus 128 and local busses 118 and 120 are free to perform other transactions In this manner, the data throughput of the hierarchical bus is increased.

An issue arises when a process migrates from one node in the multiprocessor architecture to another node. Process migration occurs when a process originally assigned to one node is suspended and later reassigned to another node. Memory that was local to the process when originally assigned may no longer be a local. For example, if a process is originally assigned to node 130 and later reassigned to node 134, what was originally local memory to the process is now remote (i.e. allocated to a different node). The process, however, may not be aware that the memory location is no longer local. If the process attempts to access a memory location local to node 130 using an LS address alias, a trap will occur. The trap is caused by an attempt to translate a virtual address using the page table structure of the node into which the process is now assigned. The page table structure does not include translations which are for addresses in LS space within another node. A trap transfers control to the operating system. The operating system moves the data that was attempted to be accessed from node 130 to node 134 using RR 308 address aliases and local (LS) writes. The memory can then be accessed using an LS address alias. The use of a hierarchical affinity scheduler, which reduces the migration of processes from one node to another, can minimize the occurrence of moving data blocks from one node to another.

An alternative to copying the data from one node to another is to change the translation of the address from local to global. For example, the following process may be used:

(1) Invalidate the local translation in all local translation tables;

(2) Invalidate the translations in the TLBs (e.g. perform a TLB shootdown);

(3) Flush all cache lines within the page for all processors in the local node; and (4) Create a new, global translation for the page.

Figure 4:
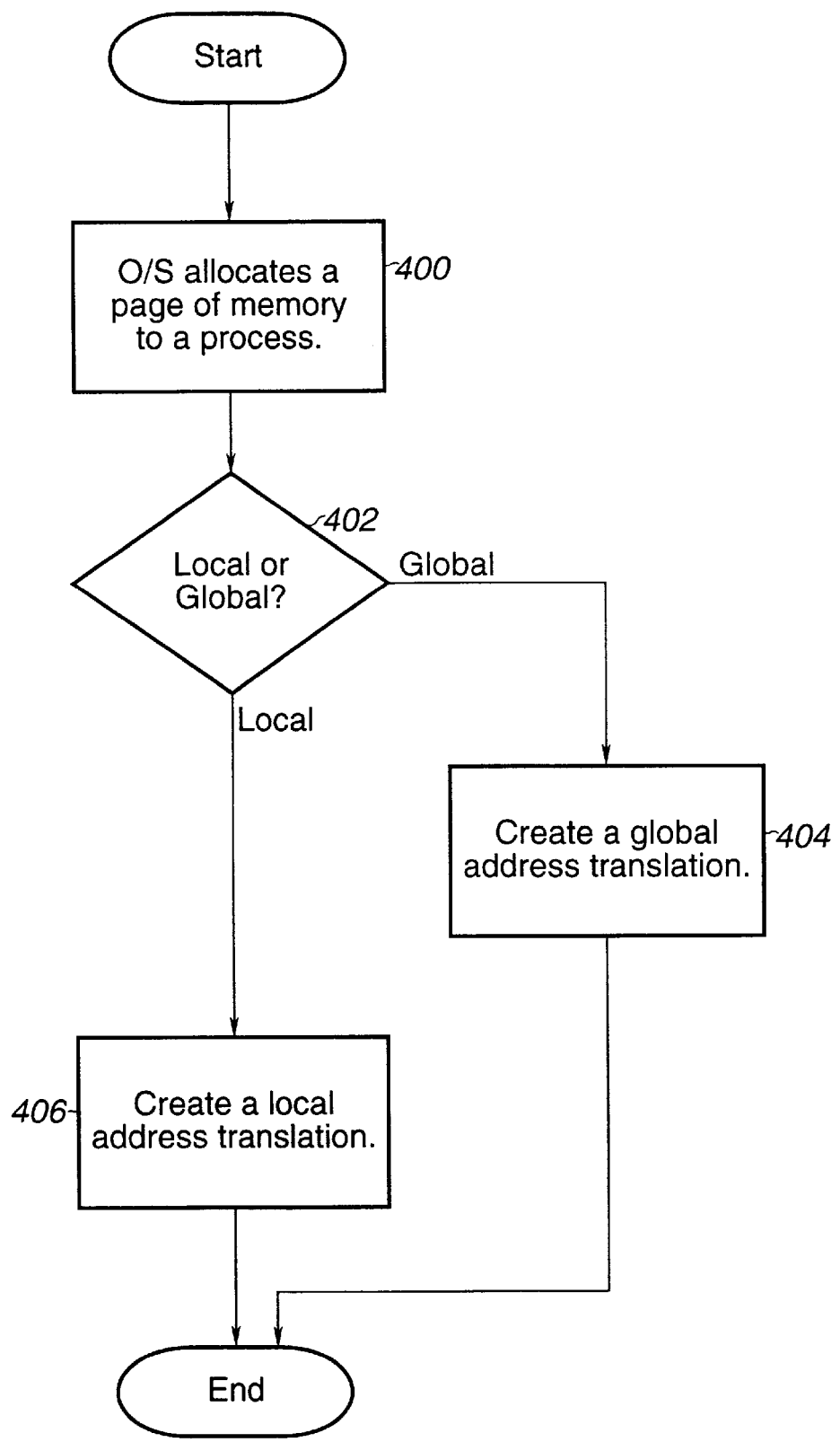
FIG. 4 is a flow diagram of the operation of an operating system in accordance with one embodiment of the present invention.

Turning next to FIG. 4, a flow diagram depicting a portion of the operation of an operating system in accordance with one embodiment of the present invention is shown. The portion shown in FIG. 4 depicts the activities performed when a page of memory is allocated to a process. A page may be allocated via an explicit request by the process being executed. Alternatively, a certain number of pages may be automatically allocated upon initiation of a process.

During a step 400, the operating system selects a page for allocation to the process. Generally, the operating system maintains a list of "free" pages (i.e. those pages which are not currently allocated to a process). One of the free pages is allocated to the process. If no pages are free, the operating system selects a currently allocated page, deallocates the page from the process to which it was allocated (including saving the data within the page to disk and invalidating the translation for the page), and allocates the page to the requesting process. Many algorithms are well known for selecting allocated pages for reallocation to a new process, generally known as demand-paged algorithms.

Upon selection of a page to allocate to the process, the operating system determines if the page should be allocated as local or global (step 402). A variety of algorithms may be used to select local versus global. As described in detail below, one scheme involves allocating pages as local initially, then changing the allocation to global upon occurrence of a trap during an attempt to access the page. Another scheme involves allocating pages as global initially, and later determining which pages to change to local based upon usage of the page by various nodes. It is noted that any suitable scheme may be employed.

If a page is determined to be global, then (as illustrated in a step 404) the operating system creates a global address translation (i.e. a translation to an address within SS space 304, RR space 308, or RS space 310). If the page table structure employed by the computer system is such that each processor or each node has its own page table structure, the translation is placed into all page table structures.

Alternatively, the operating system may determine that the page should be local. As illustrated in a step 406, the operating system creates a local translation available only within the local domain. In the exemplary page table structure described above, the translation is placed only in the page table structure of the node containing the memory. If processors in other nodes attempt to access the address, no translation will be found in their page table structures and a trap will occur.

Figure 5:
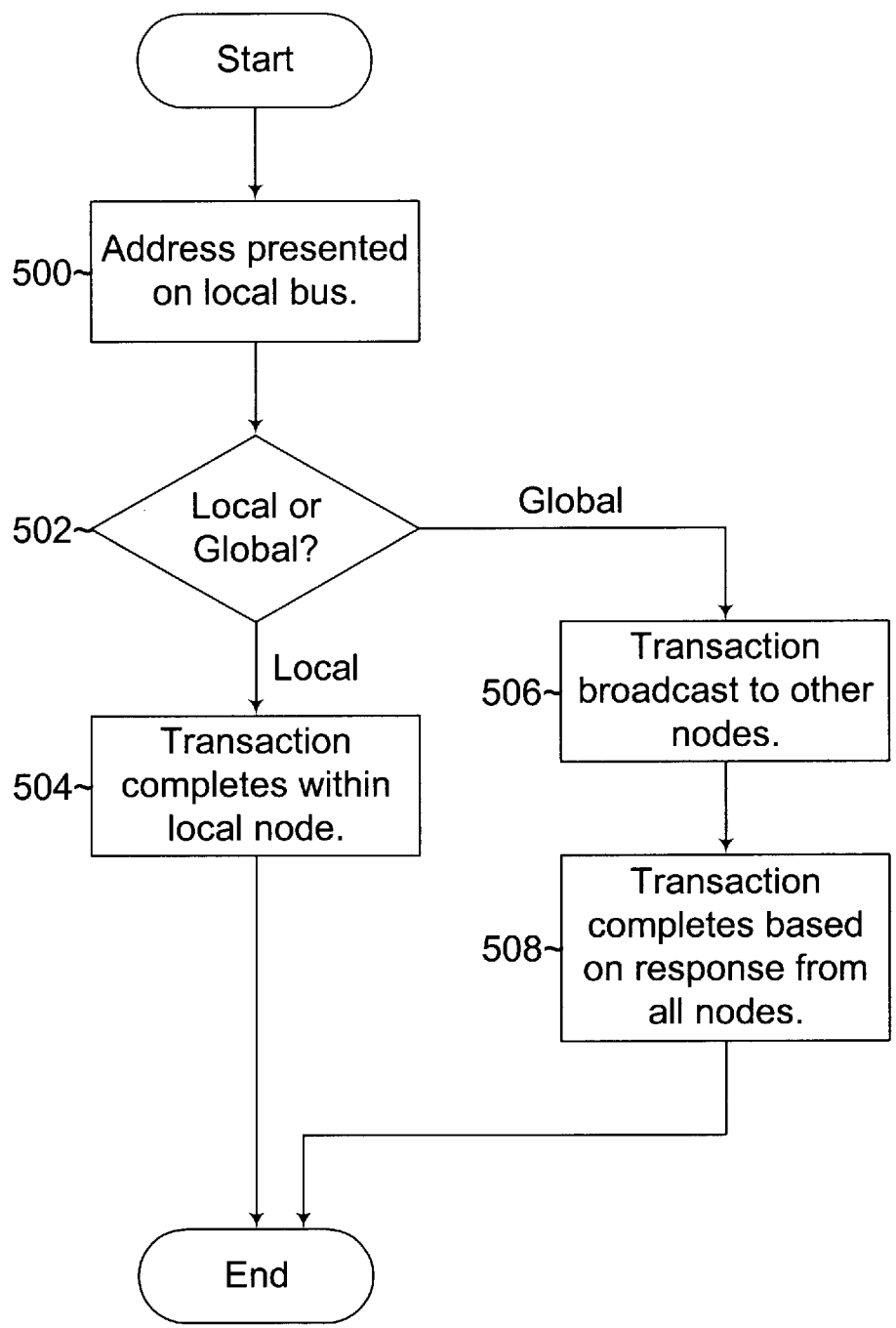
FIG. 5 is a flow diagram of the operation of a repeater in accordance with one embodiment of the present invention.

Turning next to FIG. 5, a flow diagram depicting operation of a repeater 122–126 in accordance with one embodiment of the present invention is shown. During a step 500, the repeater detects an address of a transaction being presented upon the corresponding low-level bus. As illustrated in step 502, the repeater determines if the address is local or global by determining which of the address partitions depicting in FIG. 3 contains the address.

If the address is within a local address partition (e.g. LS address partition 306 for the address space depicted in FIG. 3) then the repeater does not transmit the transaction to other repeaters. As illustrated in step 504, the transaction completes within the local node. Alternatively, the address may be within a global address partition (e.g. SS address partition 304, RR address partition 308, or RS address partition 310 for the address space depicted in FIG. 3). As illustrated in step 506, the repeater broadcasts the transactions to other nodes. The transaction subsequently completes based upon responses from all nodes, not just from the local node (step 508).

A hierarchical bus implementing the present invention has the potential for achieving higher throughput because accessing data using an LS address alias only causes local bus traffic. The hierarchical bus implements a true shared memory and potentially increases the data throughput of the system by several factors.

It is advantageous to modify the designation of memory as local or global. For example, if two processes are both accessing a page of data designated as local memory, that page is being moved from one node to another using RR address aliases each time a different process accesses it. In this case, it would be advantageous to designate that page of data as global. In addition, a page accessed by one process and only designated as global memory unnecessarily wastes bandwidth. Because the number of processes accessing a memory block changes, a method of dynamically changing the designation of memory blocks is desirable.

Several algorithms can be used for dynamically changing the designation of memory. In one embodiment, all pages of memory are originally designated as local and a counter keeps track of how many times a page is moved due to improper accesses using LS address aliases. When a threshold has been reached, the page is converted to global and no more block moves are required. In another embodiment each page is started off with a global designation. Pages are individually changed to local one at a time. Pages are then converted back to global using the algorithm discussed above. In yet another alternative, pages may be initially set to local and change to global as traps occur.

In one specific embodiment, address partitions are used to prevent a software bug in one node from corrupting data in another node. In this embodiment, only LS 306 and RR 308 address partitions are employed. This is performed by configuring the repeaters 122–124 such that only RR address aliases are broadcast. Each node runs its own kernel of the operating system. A kernel is a portion of the operating system encompassing a nucleus of the basic operating system functions. Each kernel is resident in the local memory of that node and is designated as local memory space. Therefore, nodes can only access the kernel of another node using read-only instructions. If a process on one node attempts to access the kernel of another node, the repeater will not broadcast the data request. The kernel can only be accessed from remote nodes using RR (read-only) address aliases. In this manner, a software bug running on one node cannot crash the kernel or any applications running on different nodes.

Any communications between nodes is performed in a poll based manner. Each node designates a memory location to store status bits indicating that the node has data for a process running on another node. The other processes periodically poll these status bits using RR address aliases, which are read only. When a process detects that another node has data for that process, the data is read using RR aliases. In this manner, data is transferred between nodes without any node having write access to another node. Therefore, corrupted software in one node is unable to write data to other nodes in the hierarchical bus, and corrupted software on one node is unable to corrupt software in other nodes. Alternatively, global interrupts may be supported between the processors instead of the poll-based scheme.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A multiprocessing computer system comprising:
   a first processing node including a first repeater, a first memory and a first plurality of processors, wherein said first repeater is coupled to said first plurality of processors and said first memory is coupled to said first repeater; and
   a second processing node including a second repeater, a second memory and a second plurality of processors, wherein said second repeater is coupled to said first repeater and said second plurality of processors and said second memory is coupled to said second repeater;
   wherein:
   said first repeater, upon receipt of a first transaction from one of said first plurality of processors, is configured to convey said first transaction to said second repeater if said first transaction is a global transaction;
   said first repeater is configured to isolate said first transaction from said second repeater if said transaction is a local transaction;
   said first and second memories are encompassed within an address space employed by said multiprocessing computer system; and
   a memory location within said first memory is mapped to multiple address aliases within said address space.

2. The multiprocessing computer system as recited in claim 1 wherein a first one of said multiple address aliases is a local address alias, wherein a transaction using said local address alias is said local transaction.

3. The multiprocessing computer system as recited in claim 2 wherein a second one of said multiple address aliases is a global address alias, wherein a transaction using said global address alias is said global transaction.

4. The multiprocessing computer system as recited in claim 3 wherein a third one of said multiple address aliases is a remote read address alias, wherein a transaction using said remote read address alias is a read stream transaction.

5. The multiprocessing computer system as recited in claim 4 wherein a fourth one of said multiple address aliases is a remote read/write address alias, wherein a transaction using said remote read/write address alias is either a read stream transaction or a write stream transaction.

6. A method for operating a multiprocessing computer system comprising:

initiating a first transaction by a first processor within a first processing node;

receiving said first transaction in a first repeater within said first processing node, said first repeater coupled to said first processor;

broadcasting said first transaction from said first repeater to at least one second repeater if said first transaction is a global transaction, said second repeater within a second processing node;

isolating said first transaction from said second repeater if said first transaction is a local transaction; and providing said first transaction to other processors within said first processing node;

wherein an address corresponding to said first transaction lies within one of multiple address partitions employed by the multiprocessing computer system, one of said multiple address partitions is a global address partition, and said first transaction is a global transaction if said address lies within said global partition.

7. The method as recited in claim 6 wherein one of said multiple address partitions is a local address partition, and wherein said first transaction is a local transaction if said address lies within said local partition.

* * * * *